United States Patent
Bockman et al.

(10) Patent No.: US 6,360,996 B1
(45) Date of Patent: Mar. 26, 2002

(54) STEERING CONTROL FOR SKEWED SCISSORS PAIR CMG CLUSTERS

(75) Inventors: Stuart F. Bockman, Torrance; Thomas F. Brozenec, El Segundo, both of CA (US)

(73) Assignee: Hughes Electronics Corporation, El Segundo, CA (US)

(*) Notice: Subject to any disclaimer, the term of this patent is extended or adjusted under 35 U.S.C. 154(b) by 0 days.

(21) Appl. No.: 09/511,763

(22) Filed: Feb. 24, 2000

(51) Int. Cl.$^7$ .................................................. B64G 1/28
(52) U.S. Cl. ........................................................ 244/165
(58) Field of Search ................................ 244/165, 164, 244/176, 173, 158 R

(56) References Cited

U.S. PATENT DOCUMENTS 5,107,434 A * 4/1992 Paluszek ..................... 364/455
5,681,012 A * 10/1997 Rosmann et al. ........... 244/165
5,862,495 A * 1/1999 Small ............................ 701/13

* cited by examiner

*Primary Examiner*—Peter M. Poon
*Assistant Examiner*—Timothy D Collins
(74) *Attorney, Agent, or Firm*—Terje Gudmestad

(57) ABSTRACT

An agile steering control arrangement is provided for a spacecraft having a skewed scissor pair control moment gyro (SSP CMG) attitude control arrangement gimbaled with respect to the spacecraft body. The control arrangement includes a steering control process which converts arbitrary spacecraft boresight commands into spin torque and gimbal rate commands for a pair of spinning CMG. The steering control process generates suitable CMG torque commands based on requiring that the boresight nominally follow an arbitrary boresight trajectory described by required angular accelerations for the boresight together with one of various requirements on yaw motion. In this manner, a SSP CMG actuated spacecraft can be steered having tight boresight control while allowing a certain amount of error in yaw about the desired boresight. If spin motor capacities are exceed, new gimbal rates are determined based on saturation wheel spin torque.

16 Claims, 2 Drawing Sheets

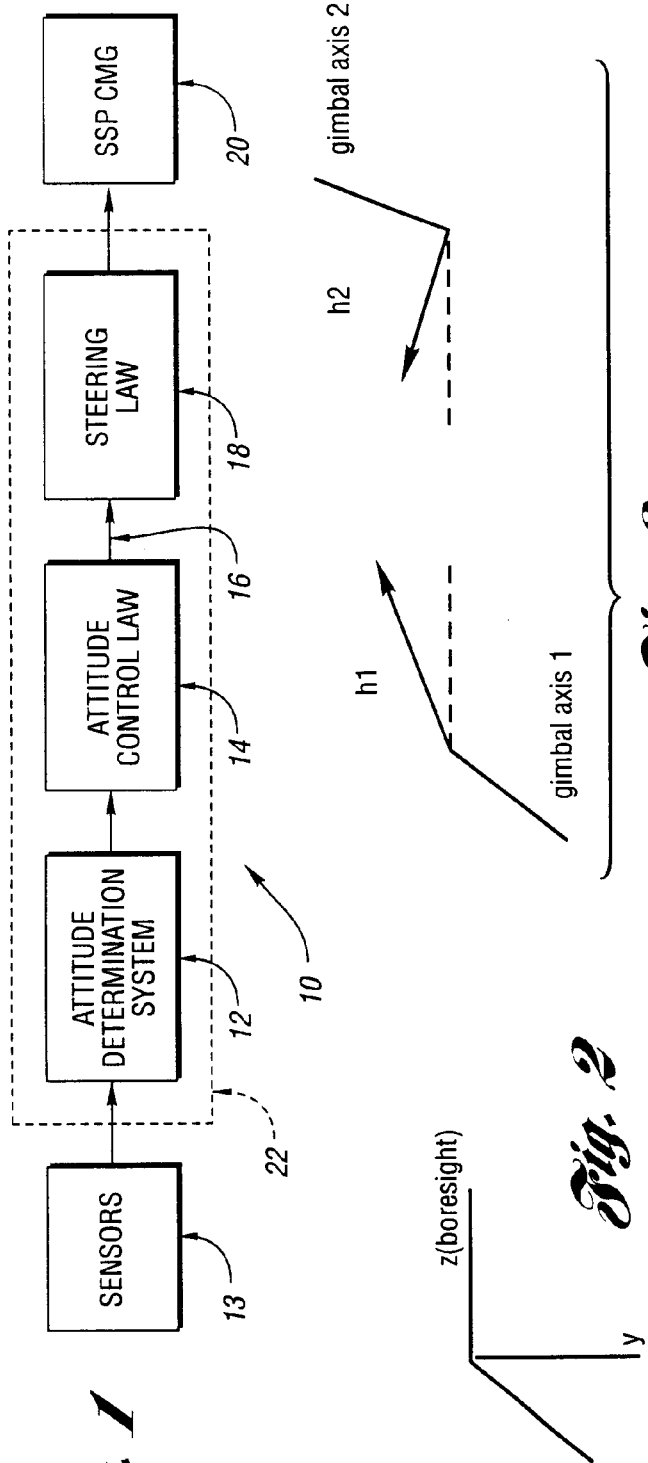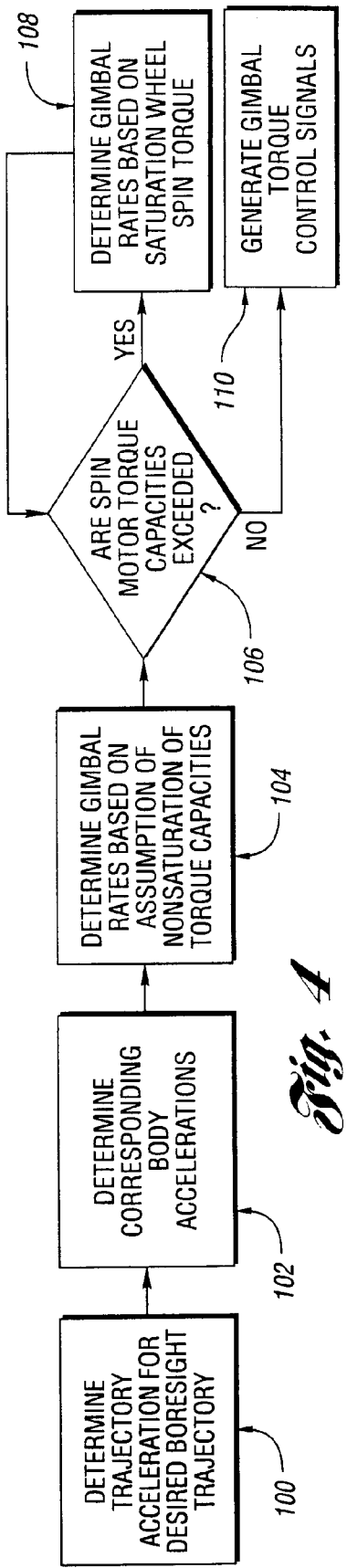

STEERING CONTROL FOR SKEWED SCISSORS PAIR CMG CLUSTERS

TECHNICAL FIELD

The present invention relates to steering control for a spacecraft, and more particularly to a control arrangement capable of converting arbitrary spacecraft boresight commands into torque and gimbal rate commands for a pair of spinning control moment gyros (CMG).

BACKGROUND ART

A CMG is a spinning momentum wheel that is gimbaled with respect to a spacecraft body about one or both axes nominally orthogonal to its momentum vector, thus permitting controlled rotation of the wheel momentum vector in the spacecraft body. Such rotation allows very large torques to be applied to the spacecraft body, thereby producing rapid acceleration. CMGs are typically employed when a large spacecraft has to be reoriented rapidly and frequently such that fuel consumption associated with using thrusters is impractical.

In most agile spacecraft applications, high torque agile motion is only required about two axes, i.e., roll and pitch, in order to point some a payload line-of-sight toward a target. Rotation of a single CMG produces a rotating torque in the spacecraft body. Typically three active CMGs are employed with some advantageous mounting geometry (e.g., gimbal axes on the faces of a pyramid) to produce a 3-axis torque for body control.

Many control laws and multiple CMG array configurations have been proposed to satisfy required 3-axis torque and momentum storage requirements. One of the more useful is known as a scissor pair array. The array employs two opposing wheel momentum vectors using anti-parallel gimbal axes. The control law constrains the gimbal rates and angles to be nominally identical. This results in a single axis body fixed torque that can be oriented along any desired axis by properly orienting the wheels. However, should the need arise to realize frequent rapid reorientations of a large spacecraft, six wheels would be required using a standard scissor pair on each of 3 axes to achieve independent uncoupled orthogonal three-axis control, while additional wheels would be required for standby redundancy in the event of failure. Thus, such an implementation is undesirably bulky, expensive, and heavy, all being crucial factors for spacecraft applications.

As an improvement to such a scissor pair implementation, commonly owned U.S. Pat. No. 5,681,012 to Rosmann et al. discloses a spacecraft control arrangement having a skewed scissor pair (SSP) CMG configuration and associated steering law. The SSP CMG steering arrangement provides a simple, lighter weight, and less expensive way to control spacecraft attitude with two axis agility and high reliability. While such an arrangement provides improved spacecraft steering control, a need still exists for a steering control process for a SSP actuated spacecraft which provides precise boresight control while also accommodating some error in "yaw" about the boresight trajectory.

DISCLOSURE OF THE INVENTION

It is therefore an object of the present invention to provide a method and system for steering a SSP actuated spacecraft which satisfies the above-noted need to provide tight boresight control while allowing a certain amount of error in yaw about the desired boresight.

It is another object of the present invention to provide a steering control arrangement for a spacecraft which allows the body of the spacecraft having a body-fixed payload boresight to be steered over arbitrary trajectories using a skewed scissor pair CMG set.

In accordance with these and other objects, the present invention provides a steering control process for converting arbitrary spacecraft boresight commands into gimbal torque or gimbal rate commands for use by a pair of CMGs in a skewed scissor pair (SSP) configuration. The steering control process is implemented in a computer based control system on board a spacecraft carrying such SSP CMGs.

In accordance with one aspect of the present invention, a method is provided for steering a spacecraft along a desired boresight trajectory, where the spacecraft includes a skewed scissor pair control moment gyro (SSP CMG) attitude control arrangement gimbaled with respect to the spacecraft body. The method includes determining trajectory accelerations corresponding to the desired boresight trajectory, determining corresponding constraints on three-axis body accelerations as a function of the desired two-axis boresight accelerations, determining body control torques consistent with a two-dimensional torque authority from SSP CMG gimballing, and determining SSP CMG gimbal rates as a function of these body control torques. The gimbal rates are used to generate torque control signals for controlling operation of SSP CMG to steer the spacecraft along the desired boresight.

In addition, in order to limit boresight yaw perturbations introduced by the torquing of the present invention, a degree of freedom control can be added by varying the toque command to a low authority torque generating device such as the CMG wheel motors. A determination is made whether the existing torque capacity of the wheel spin motor torque drive elements associated with each CMG is exceeded if torques sufficient to follow the boresight trajectory and null yaw errors are commanded. If the spin motor torque capacity is exceeded, their commands are saturated to bound yaw perturbations, and new gimbal rates are determined based on retaining precise boresight trajectory following under this perturbation.

In accordance with another aspect of the present invention, a method for steering a spacecraft having a skewed scissor pair control moment gyro (SSP CMG) attitude control arrangement gimbaled with respect to the spacecraft body includes selecting a desired boresight trajectory which is fixed relative to the spacecraft body, determining boresight angular accelerations based on the desired boresight trajectory, and translating the determined boresight angular accelerations into a set of corresponding SSP CMG gimbal rates. A determination is then made regarding whether an existing torque capacity of a motor torque drive element associated with each SSP CMG is exceed by the determined gimbal rates. If the existing torque capacity is exceeded, new gimbal rates are determined based on a reduced boresight acceleration.

In accordance with yet another aspect of the present invention, a method is provided for controlling a spacecraft attitude that includes providing at least two torque generation devices, and orienting the torque generation devices so that their torque generation vectors are not collinear. A selected boresight direction fixed relative to the spacecraft body, and the spacecraft attitude is measured using spacecraft sensors and forming corresponding pitch, roll, and yaw signals about the boresight. A trajectory command is accepted for boresight pitch and roll, and torque commands are generated based on the signals for pitch, roll and yaw about the boresight and the accepted trajectory command for boresight pitch and roll. The generated torque commands are applied through an actuator law to the at least two torque generation devices.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a block diagram of a spacecraft attitude control system in accordance with the present invention;

FIG. 2 is a diagram graphically representing the three axes about which maneuvering is performed;

FIG. 3 is a diagram graphically representing SSP CMG momentum and gimbal and torque geometry for which steering control is provided;

FIG. 4 is a flowchart showing the overall steering control process of the present invention.

BEST MODE FOR CARRYING OUT THE INVENTION

Figure 5:
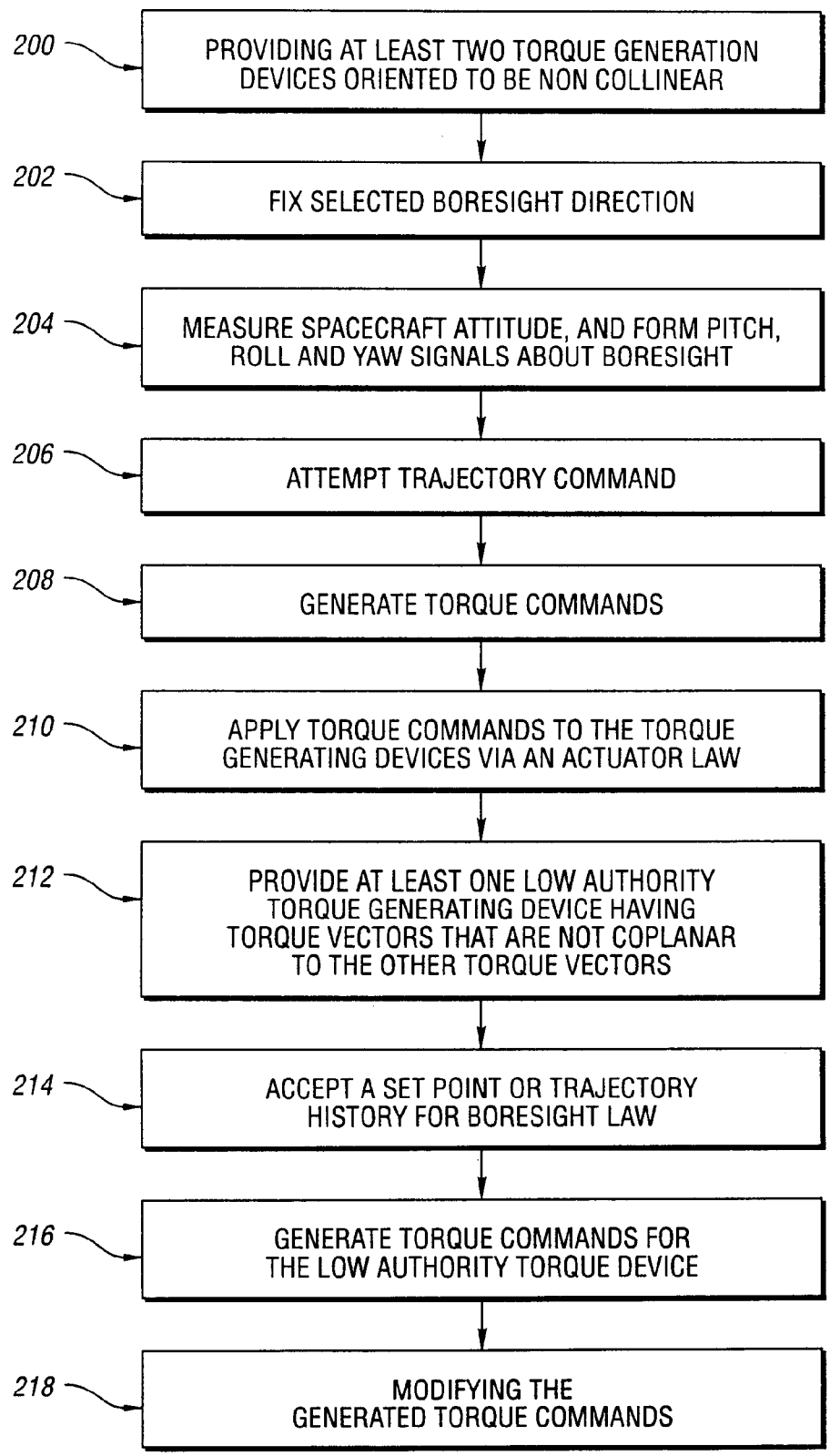
FIG. 5 is a flowchart further showing the steering control process of the present invention.

The steering control arrangement of the present invention allows the body of a spacecraft with a body-fixed payload boresight to be steered over arbitrary trajectories using a SSP CMG set. With the present invention, steering control is provided that removes constraints on a trajectory prescribed for the motion of a chosen boresight. The present invention allows nearly arbitrary boresight motion for a spacecraft, subject only to CMG torque limitations.

Referring now to FIG. 1, a block diagram is shown for a spacecraft attitude control system 10 in accordance with the present invention. More specifically, an attitude determination system 12 is provided on the spacecraft and is responsive to a set of earth, sun, and star sensors 13 and/or gyros which measure spacecraft pitch and roll attitude. Attitude determination system 12 is of conventional design. An attitude control law system 14 is responsive to both the measured signals and attitude control signals received from a ground station to generate appropriate torque control signals 16. The torque control signals are processed by a SSP steering law 18 which actuates a SSP CMG arrangement 20 to position the spacecraft as commanded. Orientation of the CMG wheels is described below. Attitude determination system 12, attitude control law system 14, and steering law 18 form a spacecraft control processor (SCP) 22

SCP 22 is programmed to carry-out the steering control process in accordance with the present invention. More specifically, the steering control process is derived to use the large torque generally available in two directions from the SSP to steer a spacecraft boresight fixed in the body frame. Typically this boresight will be chosen coincident with a payload boresight. The SSP are preferably integrated to the spacecraft so that the CMG gimbal axes are generally perpendicular to the required boresight. The actual optimal direction depends on spacecraft mass properties as well as the boresight direction. However, the steering control process of the present invention is flexible enough so that some misalignment is tolerable with reduced torque authority such as reduced trajectory rate and acceleration ability.

Once the configuration is chosen, the steering control process then generates suitable wheel torque commands based on requiring that the boresight nominally follow an arbitrary boresight trajectory described by required angular accelerations for the desired boresight together with one of various requirements on yaw motion. The "yaw" about this direction can be treated in various ways under the present invention, resulting in somewhat different steering control parameters, all of which steer the boresight along the same path.

For example, one approach could be to ignore yaw motion and not utilized any spin speed variation on the CMGs. With this approach, boresight trajectory acceleration leads to a unique command for the two CMG gimbals. Another approach is to use spin motor torquing to limit yaw perturbations. One particular approach would be to use inverse dynamics with a command for all three body accelerations when they are small and then fix the spin torques at a minimum or maximum value as soon as the spin speed torques required for three axis control saturate. The torque to be used during saturation could be derived using various approaches such as "bang-bang" control or using the saturated value of a simple linear feedback law for yaw control. Once the spin motor torques are determined, the CMG gimbal commands for boresight trajectory are uniquely determined from the required boresight acceleration. The result is tight boresight trajectory and limited perturbations of yaw about the boresight. Deviations from the nominal boresight trajectory path such as resulting from imperfections in inertia property knowledge are reduced by using linearized error feedback.

The following is a description of a particular implementation of the steering control process/law in accordance with the present invention. FIGS. 2 and 3 graphically represent the three axes and SSP CMG momentum, gimbal and torque geometry for which steering control is provided. The boresight to be controlled is in the z direction. The SSP array geometry is derived from a standard scissor pair by rotating the two gimbal axes a specified angle about the common momentum axis. If the gimbal axis displacement of three CMGs is 120°, then two of the wheels provide two axis control, such as control in the roll/pitch plane if the wheel momenta are nominally oriented parallel to the z-axis, and the third wheel can act as a spare wheel which can be substituted for either of the other two in the event of a failure.

With such a mounting orientation, the momentum contributions from the SSP is given by:

$$H^B_{CMG} = h_1 + h_2$$

where $$h_1 = 1_0[w_{s1} \cos \lambda_1 \sin \theta_1, w_{s1} \sin \lambda_1 \sin \theta_1, W_{s1} \cos \theta_1]^T$$
$$h_2 = 1_0[w_{s2} \sin \lambda_2 \sin \theta_2, w_{s2} \cos \lambda_2 \sin \theta_2, w_{s2} \cos \theta_2]_T$$

Here $h_1, h_2$ = momentum of CMG no. 1 and 2, respectively expressed in the body frame $1_0$ = CMG wheel rotor inertia $w_{s1}, w_{s2}$ = CMG no. 1 rotor spin speed and CMG no. 2 rotor spin speed, respectively $\theta_1, \theta_2$ = Gimbal angles from the nominal rotor orientation $\lambda_1, \lambda_2$ = SSP array skew angles in X-Y plane.

The following parameters are then defined as: $\lambda_1 = 0$ deg, i.e., aligned with x-axis, and $\lambda_2 = 120$ deg. The spacecraft inertia matrix is taken to be $I_{sc}$.

Desired boresight angular accelerations are then derived from a desired boresight trajectory, i.e., $dw_x/dt$ and $dw_y/dt$, where $w_x$ and $w_y$ are angular rates around the body axes x and y. When possible the yaw about the boresight is prescribed through $dw_z/dt$. Otherwise, yaw excursions are at least limited.

The above is accomplished by controlling gimbals 1 and 2 and wheel speeds. For simplicity, the present invention farther provides the additional constraint that the wheel spin accelerations are equal and opposite, i.e., $dw_{s1}/dt = -dw_{sw}/dt$.

When possible, desired accelerations about all three axes will be satisfied. However, this may not be possible if the wheel spin motors do not have sufficient torque to satisfy the desired three axis acceleration. To determine the existence of such a situation, the steering control process of the present invention has two parts. The first part calculates desired gimbal rates and CMG Wheel accelerations assuming that the motor spin torquers will not be saturated.

The desired steering control for nonsaturated situations is determined from the following map:

$$F_{NS}: [dw_x^{des}/dt, dw_y^{des}/dt, dw_z^{des}/dt] \rightarrow [d\theta_1/dt, d\theta_2/dt, dw_{s1}/dt, dw_{s2}/dt].$$

This is a mapping from desired body accelerations to CMG gimbal rates and wheel accelerations. In addition, determination of the first wheel acceleration also provides a determination for the second via the aforementioned constraint $dw_{s1}/dt = -dw_{s2}/dt$.

Derivation of the above mapping is derived by finding a one-to-one mapping from spacecraft roll and pitch accelerations to CMG gimbal rates. First, the feedback control law must be considered for the body which specifies these desired accelerations. To do so, the attitude of the spacecraft is described by a 1-2-3 Euler angle set as follows:

$$\dot{\phi} = (\omega_1 \cos \psi - \omega_2 \sin \psi)\sec \theta$$

$$\dot{\theta} = \omega_2 \cos \psi + \omega_1 \sin \psi$$

$$\dot{\psi} = \omega_3 - (\omega_1 \cos \psi - \omega_2 \sin \psi)\tan \theta \qquad (1)$$

An arbitrary boresight motion is described by specifying $\phi$, $\theta$ and their first and second derivatives. Thus, the feedback control law is given by:

$$\begin{bmatrix} \ddot{\phi}^{des} \\ \ddot{\theta}^{des} \end{bmatrix} = K_p \begin{bmatrix} \phi^{com} - \phi^m \\ \theta^{com} - \theta^m \end{bmatrix} + K_r \begin{bmatrix} \dot{\phi}^{com} - \dot{\phi}^m \\ \dot{\theta}^{com} - \dot{\theta}^m \end{bmatrix} + \begin{bmatrix} \ddot{\phi}^{com} \\ \ddot{\theta}^{com} \end{bmatrix} \qquad (2)$$

where $\phi^m$ and $\theta^m$ he measured attitude angles and $\dot{\phi}^m$ and $\dot{\theta}^m$ are the attitude rates derived, via (2), from gyro body rate measurements. The commanded boresight trajectory (position, rate, and acceleration) is given by the 6-tuple ($\phi^{com}, \dot{\phi}^{com}, \ddot{\phi}^{com}, \theta^{com}, \dot{\theta}^{com}, \ddot{\theta}^{com}$). The deviation from this commanded trajectory generates, via position and rate gains $K_p$ and $K_r$, a desired incremental acceleration. If desired closed-loop control bandwidth and damping are denoted $\omega_n$ and $\zeta$ respectively, the control gains are designated as $K_p = \omega_n^2 I_{sc}$ and $K_r = 2\zeta\omega_n I_{sc}$, where $I_{sc}$ is the spacecraft roll/pitch inertia. If the kinematic equations of (2) are differentiated, the corresponding desired body accelerations are obtained as follows:

$$\ddot{\phi} = \dot{\omega}_1 \cos\psi \sec\theta - \dot{\omega}_2 \sin\psi \sec\theta - \sec\theta - \qquad (3)$$

$$\sec\theta[\omega_3 - (\omega_1\cos\psi - \omega_2\sin\psi)\tan\theta][\omega_1\sin\psi + \omega_2\cos\psi] +$$

$$\tan\theta\sec\theta[\omega_1\cos\psi - \omega_2\sin\psi][\omega_2\cos\psi + \omega_1\sin\psi]$$

$$\ddot{\theta} = \dot{\omega}_1\sin\psi + \dot{\omega}_2\cos\psi - [\omega_3 - (\omega_1\cos\psi - \omega_2\sin\psi)\tan\theta]$$

$$[\omega_2\sin\psi - \omega_2\cos\psi]$$

$$\ddot{\psi} = \dot{\omega}_3 = \dot{\omega}_3\cos\psi\tan\theta + \dot{\omega}_2\sin\psi\tan\theta +$$

$$\tan\theta[\omega_3 - (\omega_1\cos\psi - \omega_2\sin\psi)\tan\theta][\omega_1\sin\psi + \omega_2\cos\psi] -$$

$$\sec^2\theta[\omega_1\cos\psi - \omega_2\sin\psi][\omega_2\cos\psi - \omega_2\sin\psi]$$

From the first two lines of equation (3), a one-to-one mapping from desired trajectory accelerations to desired body accelerations given by:

$$\begin{bmatrix} \dot{\omega}_1^{des} \\ \dot{\omega}_2^{des} \end{bmatrix} = \qquad (4)$$

$$\begin{bmatrix} \cos\psi \sec\theta & -\sin\psi \sec\theta \\ \sin\psi & \cos\psi \end{bmatrix}^{-1} \begin{bmatrix} \ddot{\phi}^{des} - f_1(\omega_1, \omega_2, \omega_3, \phi, \theta, \psi) \\ \ddot{\theta}^{des} - f_2(\omega_1, \omega_2, \omega_3, \phi, \theta, \psi) \end{bmatrix}$$

where $f_1$ and $f_2$ are functions having the written functional dependence whose specific form is seen from the previous differentiations. The mapping is one-to-one as long as $\theta \leq 90°$ as a result of the attitude parameterization chosen. Use of quaternions, for instance, would avoid this singularity. In any case, for nominally earth pointing missions, if $\phi$, $\theta$, and $\psi$ are defined with respect to an orbiting reference frame, the spacecraft attitude would not come close to the singularity.

With the one-to-one mapping derived, we then let:

$$Y = 1_0[\sin\theta_1 - 0.5\sin\theta_2, 0.5*\text{sqrt}(3)*\sin\theta_2, \cos\theta_1 + \cos\theta_2]^T.$$

Assuming the above constraint on wheel accelerations, $Y * dw_{s1}/dt$ is the torque applied to the spacecraft as a result of accelerating the CMG wheels. Then, the steering control $F_{NS}$ is given by:

$$[J_{ssp}|Y][d\theta_1/dt, d\theta_2/dt, dw_{s1}/dt]^T = 1_{sc} dw^{des}/dt + w \times 1_{sc} w + w \times H^B_{CMG}$$

where $$J_{ssp} = [w_{s1}\cos\theta_1 \quad 0.5 w_{s2}\cos\theta_2]$$

$$l_0[0 \quad -.5*\text{sqrt}(3)*w_{s2}\cos\theta_2]$$

$$[-w_{s1}\sin\theta_1 \quad w_{s2}\sin\theta_2]$$

is the Jacobian which provides the torques applied to the body when multiplied by the CMG gimbal rate vector; w is the spacecraft body rate vector (inertial rate expressed in the body frame); and $dw^{des}/dt$ is the vector of desired body accelerations. If the solution is less then the saturation value. i.e., $|dw.1/dt| \leq dw_{sat}/dat$, the desired body acceleration about all three axes including the boresight axis can be achieved and calculations are complete. If, however the saturation value is exceeded, i.e., $|dw_{s1}/dt| > dw_{sat}/dat$, then the CMG wheel motor spin torquers are not large enough to achieve the desired acceleration about the boresight, $dw_z^{des}/dt$, but the desired motion, $dw_x^{des}/dt$ and $dw_y^{des}/dt$, of the boresight can be achieved at the expense of deviating from the desired acceleration about the boresight. If, the latter is found to be true, the saturated portion of the steering control process of the present invention will ensure the desired boresight motion.

More specifically, for saturated situations, the desired steering control is derived from the following two maps:

$$F_s: [dw_x^{des}/dt, dw_y^{des}/dt] \rightarrow [d\theta_1/dt, d\theta_2/dt] \& dw_z^{des}/dt \rightarrow [dw_{s1}/dt, dw_{s2}/dt];$$

where the constraint $dw_{s1}/dt = -dw_{s2}/dt$ is again provided. This choice of constraints tends to spread the required momentum storage efficiently among the available wheels and increase effective "spin" torque by avoiding constraints of wheel overspeed. With the present invention, the parameter $dw_z^{des}/dt$ will not be exactly achieved, but the desired yaw boresight motion, $dw_x^{des}/dt$ and $dw_y^{des}/dt$ is produced. From the nonsaturated portion of the control process described above, the following is obtained:

$$[dw_{s1}/dt, dw_{s2}/dt] = [\text{sat}(dw_{s1}^{NS}/dt), \text{sat}(dw_{s2}^{NS}/dt)]$$

where $dw_{s1}^{NS}/dt$ and $dw_{s2}^{NS}/dt$ are the solutions from the nonsaturated portion of the control process; and sat is the saturation function defined as follows:

sat(x)=x, if x is smaller than or equal to the saturation value;

+saturation value, if x is larger than the saturation value and positive;

−saturation value, if x is larger in absolute value than the saturation value but negative.

Then, the gimbal angles are calculated from:

$$[d\theta_1/dt, d\theta_2/dt, dw_z^{exp}/dt]^T = [J_{ssp}51 [1_{13}, 1_{23}, 1_{33}]^T]^{-1} * \{1_{sc}*$$
$$[dw_x^{des}/dt, dw_y^{des}/dt, 0]^T + WX1_{sc}w + w \times H^B_{CMG} + J_{wheel} * dw_s/dt\}$$

where the saturated values of wheel speed acceleration $dw_s/dt$ are used in the expression:

$$J_{wheel} = [\sin\theta_1 \quad 0.5\sin\theta_2]$$
$$I_0[0 \quad -0.5*\text{sqrt}(3)*\sin\theta_2]$$
$$[\cos\theta_1 \quad \cos\theta_2].$$

The third element of the solution $dw_z^{exp}/dt$ provides the expected acceleration about the boresight axis. The factors $I_{13}$, $I_{23}$, and $I_{33}$ are respective elements of the spacecraft inertia matrix $I_{sc}$. The individual CMG wheels should be sized to ensure the required rank of the matrix, taking into account momentum storage requirements.

Thus the present invention provides a steering control process for a SSP CMG cluster that allows agile (high bandwidth) retargeting of the yaw axis (or another body-fixed axis) along an arbitrary trajectory with loose (low bandwidth) control about the yaw axis by modulating the CMG wheel speeds. By taking advantage of a relaxed pointing requirement about a boresight axis, the trajectory limitations of previous steering control processes can be overcome.

Referring now to FIG. 4, a flowchart summarizes the overall steering control process of the present invention described above. As shown at block 100, the control process initially determines trajectory accelerations corresponding to the desired boresight trajectory. Corresponding body accelerations are then determined as a function of the desired trajectory accelerations as denoted at block 102. At block 104, CMG gimbal rates are determined as a function of the body accelerations.

As noted previously, this operation is carried out assuming that the CMGs will not be saturated. However, this may not always be true. Thus, at block 106, the control process subsequently determines whether an existing torque capacity of a spin motor torque drive element associated with each CMG is exceed by the determined gimbal rates. If the capacity is exceeded, new gimbal rates are determined at block 108 based on saturation wheel spin torque, and again checked at block 106 to insure the capacities are not exceeded. Once the existing torque capacities are not exceed, torque control signals are generated at block 110 for controlling operation of the CMGs based on the determined gimbal rates.

It is noted that while the steering control process of the present invention has been described in context with controlling the two active wheels of a SSP configuration, the control process does generalize to provide support for any two CMGs for boresight trajectory control whether the CMGs are in a SSP configuration or not.

Referring now to the flow chart in FIG. 5, the present invention, as described above, can be summarized as a process for controlling a spacecraft attitude that includes providing at least two torque generation devices, such as two single axis control moment gyros, so that their torque generation vectors are not collinearly oriented as denoted at block 200. A selected boresight direction is fixed relative to the spacecraft body at block 202, and the spacecraft attitude is measured using spacecraft sensors and forming corresponding pitch, roll, and yaw signals about the boresight at block 204. A trajectory command is accepted at block 206 for boresight pitch and roll, and torque commands are generated at block 208 based on the signals for pitch, roll and yaw about the boresight and the accepted trajectory command for boresight pitch and roll. As denoted at block 210, the generated torque commands are then applied through an actuator law to the at least two torque generation devices. The boresight direction can be selected to be parallel with nominal wheel axes of a skewed scissors pair.

In addition, at block 212, at least one low authority torque generation device, such as a spin motor of in each control moment gyro, can be provided having an orientation that provides torque vectors that are not coplanar with the torque generation vectors of the at least two torque generation devices. A set point or desired history for boresight yaw is accepted at block 214, and torque commands are generated at block 216 for the at least one low authority torque device that reduce error between yaw about spacecraft boresight and the desired history during boresight trajectory control. The generated torque commands applied through the actuator law are modified at block 218 based on the signals for pitch, roll and yaw about the boresight and the accepted trajectory command for boresight pitch and roll to compensate for the torque commands generated for the low authority torque device and maintain precise boresight pitch and roll following. As noted above, a linear yaw error feedback law can be used to generate the torque commands for the low authority torque generation device(s), and the torque commands for the low authority device can be saturated to minimize excursions of boresight yaw from the desired yaw.

While the best mode for carrying out the invention has been described in detail, those familiar with the art to which this invention relates will recognize various alternative designs and embodiments for practicing the invention as defined by the following claims.

What is claimed is:

1. A method of controlling a spacecraft attitude comprising:

providing at least two torque generation devices by providing at least two single axis control moment gyros;

orienting said torque generation devices so that their torque generation vectors are not collinear by orienting the two control movement gyros as a skewed scissor pair;

selecting a boresight direction fixed relative to the spacecraft body by selecting the boresight direction parallel with nominal wheel axes of the skewed scissors pair;

measuring spacecraft attitude using spacecraft sensors and forming corresponding pitch, roll, and yaw signals about the boresight;

accepting a trajectory command for boresight pitch and roll;

generating torque commands based on the signals for pitch, roll and yaw about the boresight and the accepted trajectory command for boresight pitch and roll; and applying the generated torque commands through an actuator law to the at least two torque generation devices.

2. A method of controlling a spacecraft attitude comprising:

providing at least two torque generation devices by providing at least two single two axis control moment gyros;

orienting said torque generation devices so that their torque generation vectors are not collinear;

selecting a boresight direction fixed relative to the spacecraft body;

measuring spacecraft attitude using spacecraft sensors and forming corresponding pitch, roll, and yaw signals about the boresight;

accepting a trajectory command for boresight pitch and roll;

generating torque commands based on the signals for pitch, roll and yaw about the boresight and the accepted trajectory command for boresight pitch and roll;

applying the generated torque commands through an actuator law to the at least two torque generation devices;

providing at least one low authority torque generation devices;

orienting the low authority devices so that their torque vectors are not coplanar with the torque generation vectors of the at least two torque generation devices;

accepting a set point or desired history for boresight yaw;

generating torque commands for the at least one low authority torque device that reduce error between yaw about spacecraft boresight and the desired history during boresight trajectory control; and modifying the torque commands generated based on the signals for pitch, roll and yaw about the boresight and the accepted trajectory command for boresight pitch and roll to compensate for the torque commands generated for the low authority torque device and maintain precise boresight pitch and roll following.

3. The method of claim 2 wherein the low authority torque generation device comprises a spin motor of in each of the at least two control moment gyros.

4. The method of claim 3 further comprising constraining the spin motor command toques to be equal.

5. A method of controlling a spacecraft attitude comprising:

providing at least two torque generation devices;

orienting said torque generation devices so that their torque generation vectors are not collinear;

selecting a boresight direction fixed relative to the spacecraft body;

measuring spacecraft attitude using spacecraft sensors and forming corresponding pitch, roll, and yaw signals about the boresight;

accepting a trajectory command for boresight pitch and roll;

generating torque commands based on the signals for pitch, roll and yaw about the boresight and the accepted trajectory command for boresight pitch and roll;

applying the generated torque commands through an actuator law to the at least two torque generation devices;

providing at least one low authority torque generation devices;

orienting the low authority devices so that their torque vectors are not coplanar with the torque generation vectors of the at least two torque generation devices;

accepting a set point or desired history for boresight yaw;

generating torque commands for the at least one low authority torque device that reduce error between yaw about spacecraft boresight and the desired history during boresight trajectory control; and modifying the torque commands generated based on the signals for pitch, roll and yaw about the boresight and the accepted trajectory command for boresight pitch and roll to compensate for the torque commands generated for the low authority torque device and maintain precise boresight pitch and roll following.

6. The method of claim 5 wherein generating torque commands for the low authority torque generation device comprises a linear yaw error feedback law.

7. The method of claim 5 further comprising saturating the torque commands for the low authority device to minimize excursions of boresight yaw from the desired yaw.

8. A method of controlling a spacecraft attitude comprising:

providing at least two torque generation devices;

orienting said torque generation devices so that their torque generation vectors are not collinear;

selecting a boresight direction fixed relative to the spacecraft body;

measuring spacecraft attitude using spacecraft sensors and forming corresponding pitch, roll, and yaw signals about the boresight;

accepting a trajectory command for boresight pitch and roll;

generating torque commands based on the signals for pitch, roll and yaw about the boresight and the accepted trajectory command for boresight pitch and roll;

applying the generated torque commands through an actuator law to the at least two torque generation devices;

wherein bore sight pitch and roll excursions from the command trajectory are minimized by adding a feedback law acting on the error between the boresight pitch and roll trajectory and the sensed boresight pitch and roll.

9. A method for steering a spacecraft along a desired boresight trajectory, wherein the spacecraft includes a set of control moment gyros and associated attitude control arrangement gimbaled with respect to the spacecraft body, said method comprising:

determining trajectory accelerations corresponding to the desired boresight trajectory;

determining corresponding body accelerations as a function of the desired trajectory accelerations;

determining control moment gyro gimbal rates as a function of the determined body accelerations; and generating torque control signals for controlling operation of the, control moment gyro based on the determined gimbal rates.

10. The method of claim 9 wherein determining trajectory accelerations corresponding to the desired boresight trajectory comprises controlling gimbals and wheel speeds of the control moment gyros.

11. The method of claim 10 further comprising controlling wheel spin accelerations of two control moment gyros having parallel spin axes to be equal and opposite in direction.

12. The method of claim 9 wherein control moment gyros are configured as a skewed scissor pair.

13. The method of claim 9 further comprising determining whether an existing torque capacity of a motor torque drive element associated with each control momentum gyro is exceed by the determined gimbal rates; and determining new gimbal rates based on a reduced boresight acceleration if the existing torque capacity is exceeded.

14. A method for steering a spacecraft having a skewed scissor pair control movement gyro (SSP CMG) attitude control arrangement gimbaled with respect to the spacecraft body, said method comprising:

selecting a desired boresight trajectory which is fixed relative to the spacecraft body;

determining the boresight angular accelerations based on the desired boresight trajectory;

translating the determined boresight angular accelerations into a set of corresponding SSP CMG gimbal rates;

determining whether an existing torque capacity of a motor torque drive element associated with each SSP CMG is exceeded by the determined gimbal rates; and determining new gimbal rates based on a reduced boresight acceleration if the existing torque capacity is exceeded.

15. The method of claim 14 wherein determining boresight accelerations based on the desired boresight trajectory comprises controlling gimbals and wheel speeds of the SSP CMG.

16. The method of claim 15 further comprising controlling wheel spin accelerations of two SSP CMG having parallel spin axes to be equal and opposite in direction.

* * * * *